United States Patent
Lukowski et al.

(10) Patent No.: US 9,945,260 B2
(45) Date of Patent: Apr. 17, 2018

(54) HUB OF AN INTERMEDIATE CASING FOR AN AIRCRAFT TURBOJET ENGINE COMPRISING DOORS WITH CONTOURED GEOMETRY

(71) Applicant: SNECMA, Paris (FR)

(72) Inventors: Benjamin Lukowski, Moissy-Cramayel (FR); Philippe Jacques Fessou, Moissy-Cramayel (FR)

(73) Assignee: SNECMA, Paris (FR)

(*) Notice: Subject to any disclaimer, the term of this patent is extended or adjusted under 35 U.S.C. 154(b) by 304 days.

(21) Appl. No.: 14/906,934

(22) PCT Filed: Jul. 23, 2014

(86) PCT No.: PCT/FR2014/051907
§ 371 (c)(1),
(2) Date: Jan. 22, 2016

(87) PCT Pub. No.: WO2015/011413
PCT Pub. Date: Jan. 29, 2015

(65) Prior Publication Data
US 2016/0153314 A1    Jun. 2, 2016

(30) Foreign Application Priority Data

Jul. 23, 2013    (FR) .................................. 13 57254

(51) Int. Cl.
*F01D 25/24*    (2006.01)
*F01D 25/28*    (2006.01)
(Continued)

(52) U.S. Cl.
CPC .......... *F01D 25/28* (2013.01); *F01D 17/105* (2013.01); *F01D 25/24* (2013.01); *F02C 7/052* (2013.01);
(Continued)

(58) Field of Classification Search
CPC ........ F01D 17/105; F01D 25/24; F01D 25/28; F02K 3/075; F02C 7/052; F05D 2240/128; F05D 2250/411
See application file for complete search history.

(56) References Cited

U.S. PATENT DOCUMENTS 4,250,703 A * 2/1981 Norris .................... B64D 33/02
244/53 B
5,279,109 A    1/1994 Liu et al.
(Continued)

FOREIGN PATENT DOCUMENTS

EP    2 433 864 A1    3/2012
FR    2 961 257 A1    12/2011
(Continued)

OTHER PUBLICATIONS

French Preliminary Search Report and Written Opinion dated May 15, 2014 in Patent Application No. 1357254 (with English Translation of Categories of Cited Documents).
(Continued)

*Primary Examiner* — Igor Kershteyn
(74) *Attorney, Agent, or Firm* — Oblon, McClelland, Maier & Neustadt, L.L.P.

(57) ABSTRACT

A hub of an intermediate casing for an aircraft turbojet engine, including an inner shell intended to define a primary flow space of a primary gas stream into a turbojet engine, and at least one intermediate space, the inner shell being provided with at least one primary port and at least one movable door forming a primary air passage conduit, the door being capable of collecting, from the primary port, air flowing in the primary gas space and of sending the air collected in this way, via the intermediate space, towards a secondary air passage conduit. The primary conduit has an inner surface including, from upstream to downstream, a converging upstream part, then a nonconverging down-
(Continued)

stream part, in which the downstream part includes two portions of downstream side surface, and in which the upstream portion further includes two portions of upstream side surface.

10 Claims, 9 Drawing Sheets (51) Int. Cl.
 *F01D 17/10* (2006.01)
 *F02K 3/075* (2006.01)
 *F02C 7/052* (2006.01)
(52) U.S. Cl.
 CPC ........ *F02K 3/075* (2013.01); *F05D 2240/128* (2013.01); *F05D 2250/411* (2013.01)

(56) References Cited

U.S. PATENT DOCUMENTS

| | | | |
|---|---|---|---|
| 6,499,285 B1* | 12/2002 | Snyder | B64D 33/02 244/53 B |
| 6,702,873 B2* | 3/2004 | Hartman | B01D 46/0043 55/434 |
| 8,408,868 B2* | 4/2013 | Hatman | F01D 5/081 415/207 |
| 8,424,279 B2* | 4/2013 | Rajamani | B01D 45/14 415/122.1 |
| 9,046,056 B2* | 6/2015 | Lerg | B01D 45/06 |
| 2010/0132367 A1 | 6/2010 | Brogren | |
| 2012/0073262 A1 | 3/2012 | Bulin et al. | |

FOREIGN PATENT DOCUMENTS

| | | |
|---|---|---|
| GB | 2 259 328 A | 3/1993 |
| WO | WO 2008/147260 A1 | 12/2008 |

OTHER PUBLICATIONS

International Search Report and Written Opinion dated Nov. 26, 2014 in Patent Application No. PCT/FR2014/051907 (with English Translation of Categories of Cited Documents).
International Search Report dated Nov. 26, 2014, in PCT/FR2014/051907 filed Jul. 23, 2014.

* cited by examiner

HUB OF AN INTERMEDIATE CASING FOR AN AIRCRAFT TURBOJET ENGINE COMPRISING DOORS WITH CONTOURED GEOMETRY

GENERAL FIELD

The present invention relates to a hub of an intermediate casing for aircraft turbojet engine, in particular of the type comprising at least two mechanically independent bodies.

In a double-body turbojet engine intermediate casing usually designates a casing the hub of which is arranged between a casing of a low-pressure compressor and a casing of a high-pressure compressor.

The present invention relates more particularly to a hub of an intermediate casing of the type comprising bleed valves, sometimes designated by their acronym VBV (Variable Bleed Valves).

Valves of this type are intended to regulate the inlet flow rate of the high-pressure compressor especially to limit pumping risks of the low-pressure compressor and enable evacuation of some of the air from the annular flow space of the primary flow.

Also, in case of accidental penetration of water into this flow space especially in the form of rain or hail, or even various debris likely to harm operation of the turbojet engine, these valves retrieve this water or this debris which are centrifuged in the above flow space and ejected to the outside of the latter.

In the case of bypass turbojet engines, these valves are configured to allow passage of fragments or debris from the flow space of the primary flow to a secondary annular flow space of a secondary flow.

PRIOR ART

Figure 1:
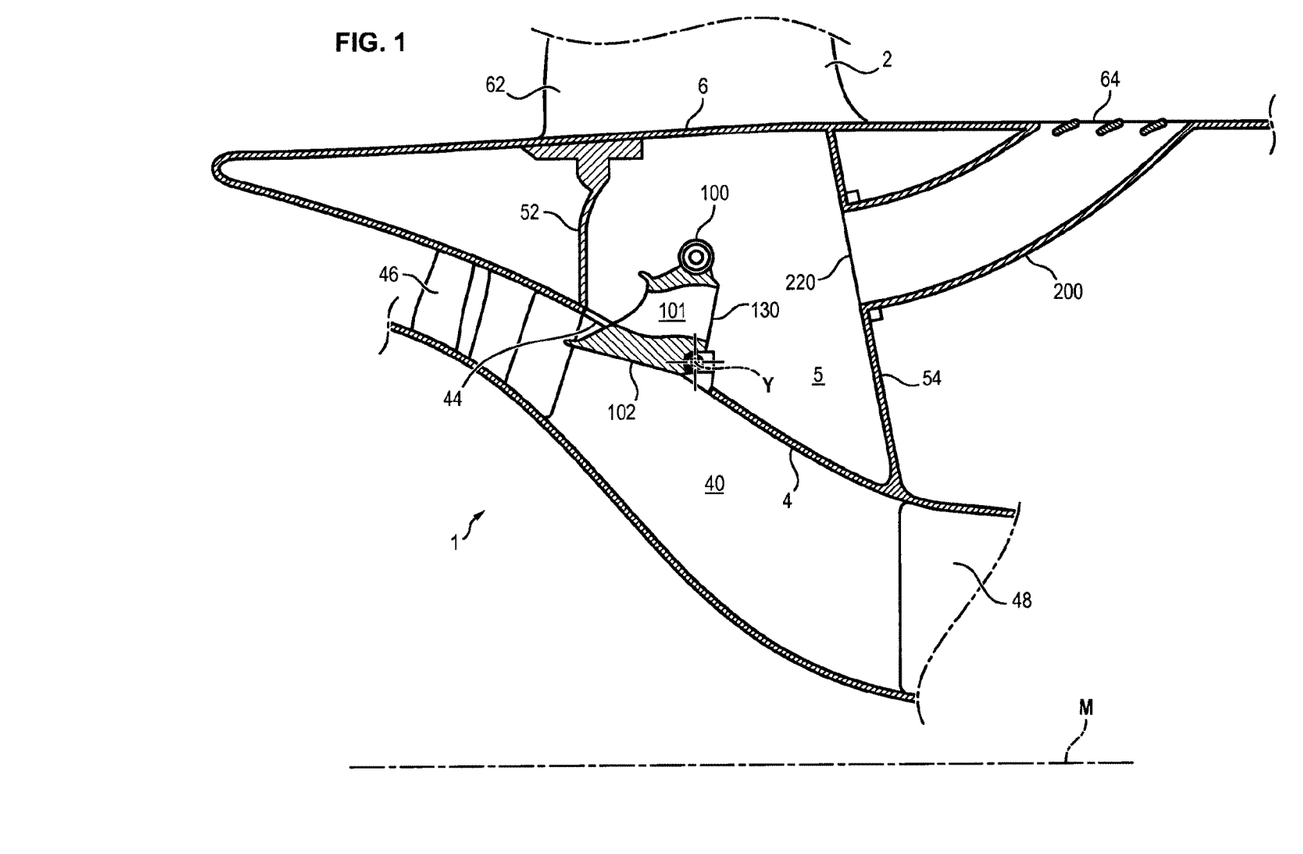
FIG. 1, already discussed, is a view in axial section of a hub for an intermediate casing 2 known from the prior art.
Figure 2:
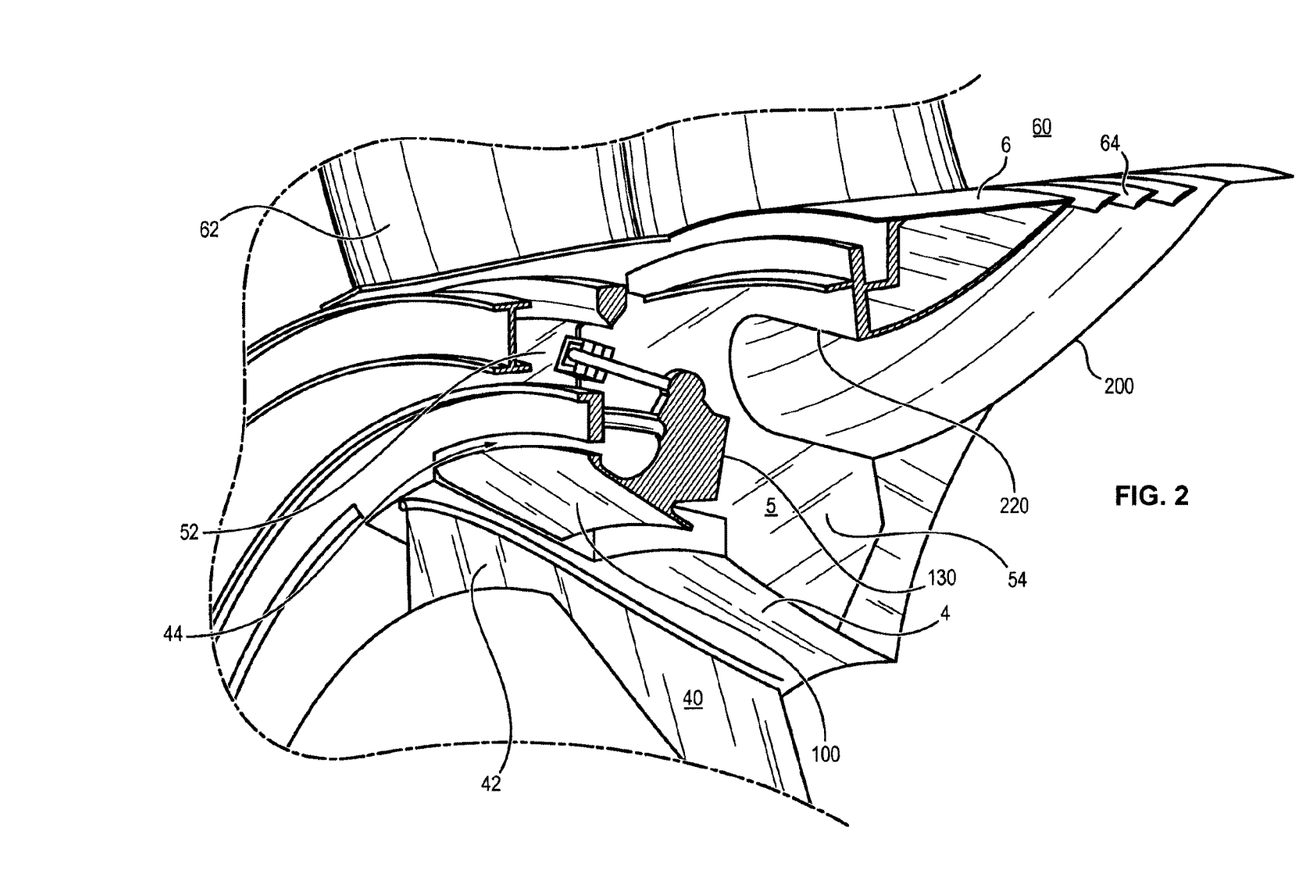
FIG. 2, already discussed, is a view in perspective and in axial section of the hub of FIG. 1.

As illustrated in FIGS. 1 and 2, which are partial viewed in axial section of a bypass and double-body aircraft turbojet engine of known type, the hubs of the intermediate casings of the above type usually comprise two annular coaxial ferrules, respectively internal 4 and external 6, mutually connected by an upstream transversal endshield 52 and by a downstream transversal endshield 54.

The upstream endshield 52 is arranged downstream of a low-pressure compressor 46 of the turbojet engine whereas the downstream endshield 54 is arranged upstream of a high-pressure compressor 48 of this turbojet engine.

The high-pressure compressor 48 generally comprises a succession of variable-timing rotors and stators, for controlling the flow rate of air passing through it.

Arranged between the internal 4 and external 6 ferrules, and between the upstream 52 and downstream 54 transversal endshields, are intermediate spaces 5 distributed around the axis M of the hub.

The internal ferrule 4 delimits a primary annular flow space 40 of a primary flow of the turbojet engine, and is in general attached to structural arms 42 passing through this space. Also, the internal ferrule 4 comprises air passage orifices 44, called primary orifices hereinbelow, each of which is blocked by the pivoting valve 102 of a corresponding bleed valve intended for regulation of the flow rate of the high-pressure compressor 48 and, if needed, evacuation of air or debris as explained hereinabove.

Such a bleed valve can take the form of a door 100 which comprises the valve 102 at its radially internal end and which is pivotably mounted around an axis Y such that when the primary orifices 44 are in a closing position, the valve prolongs the internal ferrule 4 of the casing 2 substantially continuously to best reduce the risks of aerodynamic perturbations of the primary flow via this valve 102, and that when said primary orifices are in an opening position the valve projects radially towards the inside relative to the above internal ferrule 4 and forms a scoop sampling of some of the primary flow in the space 40. The door 100 comprises a conduit 101 via which scooped air transits, the conduit 101 terminating downstream on an outlet orifice 130 terminating in a corresponding intermediate space 5.

The external ferrule 6 delimits a secondary annular flow space 60 of a secondary flow of the turbojet engine, and is attached to structural arms 62 passing through this space. Also, the external ferrule 6 comprises air passage orifices 64, called secondary orifices hereinbelow, and arranged downstream of the downstream transversal endshield 54.

When the variable-timing stators of the high-pressure compressor 48 are in a position reducing the airflow rate entering this compressor, an excess of air in the secondary flow space can be evacuated via these secondary orifices, avoiding pumping phenomena which can result in deterioration or even complete destruction of the low-pressure compressor 46.

Secondary conduits 200 extend each between a respective inlet orifice 220 terminating in the intermediate space 5 and a corresponding secondary orifice 64. The inlet orifice 220 is generally arranged near the surface of the downstream transversal endshield opening onto the intermediate space 5.

The outlet orifice 130 of the primary conduit 101 and the inlet orifice 220 of the secondary conduit 200 are arranged opposite in each intermediate space 5.

Each door 100, the intermediate space 5 and the corresponding downstream secondary conduit together form an air and debris evacuation system from the primary flow space 40 towards the secondary flow space 60. The hub therefore comprises a plurality of such systems distributed around its axis.

When a door 100 is in the open position, airflow scooped by the latter passes through the primary conduit and terminates in the intermediate space 5 by its outlet orifice 130, penetrates the corresponding secondary conduit 200 until it reaches the secondary flow space 60.

Figure 3:
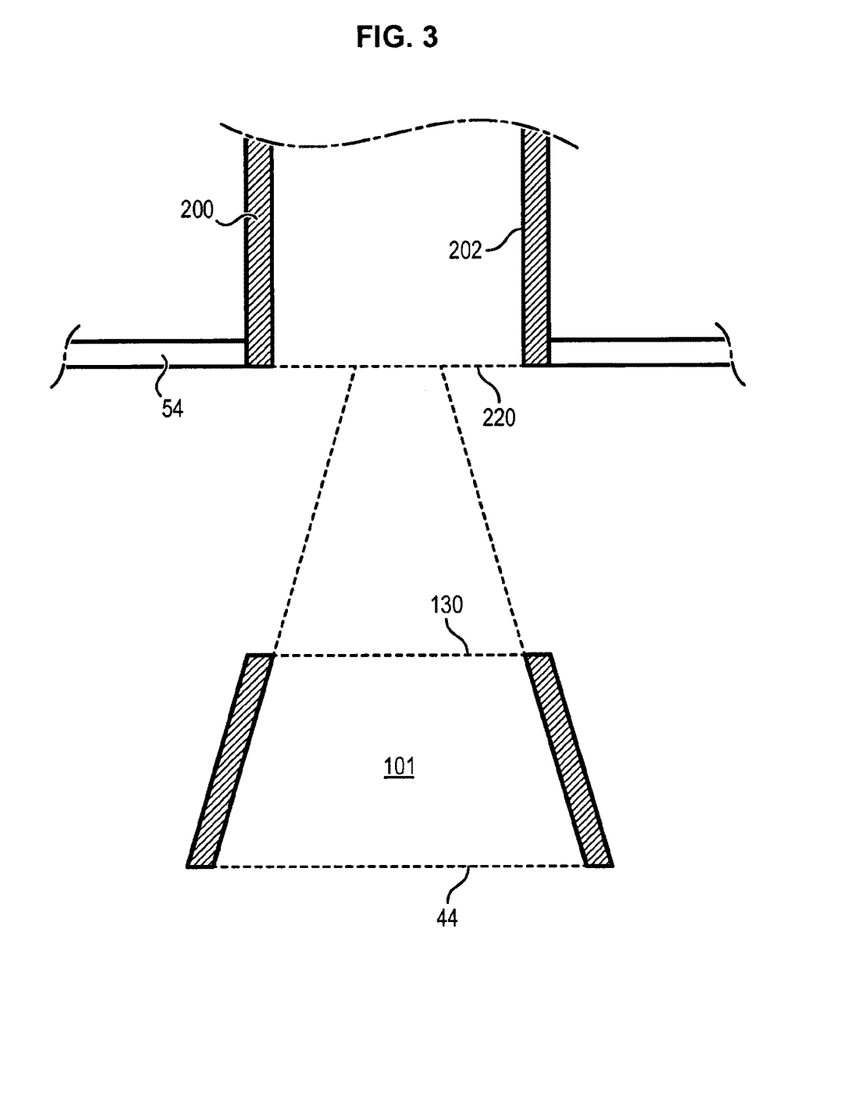
FIG. 3, already discussed, is a sectional view of an evacuation system of debris known from the prior art in a plane perpendicular to the plane of FIG. 1, so-called azimuthal plane.

Each door 100 has an internal surface 101 including two planar lateral portions and mutually convergent in an azimuthal plane parallel to the plane of FIG. 3, from the primary orifice 44 towards the outlet orifice 130. This azimuthal convergence is done for two reasons: both to boost the airflow rate scooped from the primary annular space and also due to equipment housed in between the intermediate spaces distributed around the axis M of the hub, limiting the dimensions of the outlet orifices in the corresponding azimuthal plane.

However, an airflow scooped by means of such evacuation systems undergoes loss of load when this flow passes through the intermediate space. The consequence of these load losses is reducing the air sampling flow rate from the primary flow space 40 towards the secondary flow space 60.

Now, this flow rate must respect a certain specification for sampling air necessary for operability of the motor during all its flight phases. Also a substantial flow rate gap between the inlet of the low-pressure compressor 46 and the inlet of the high-pressure compressor 48 can lead to deterioration of the low-pressure compressor 46, above during deceleration phases.

A solution for avoiding these load losses could in theory be to directly attach the primary 101 and secondary 200 conduits. Such attachment however is very difficult to do due to the moveable character of the door 100, and would consume too much space in this intermediate space in which other equipment is housed.

Another solution consisting of deflectors extending in the intermediate space 5 has already been proposed in patent application FR 2 936 561. These deflectors present an open internal surface in the form of a tongue and extending from a radially internal edge of the inlet orifice of each secondary conduit relative to the axis of the hub, and are provided to guide air and debris in the intermediate space 5 coming from the primary conduit towards the secondary conduit.

However, these deflectors presenting an open surface prove insufficient for resolving the above loss of load problems, especially in the azimuthal plane.

SUMMARY OF THE INVENTION

An aim of the invention is especially to contribute a simple, economical and efficacious solution to these losses of load problems.

For this reason a hub of an intermediate casing for an aircraft turbojet engine is proposed, comprising an internal ferrule intended to delimit both a primary flow space of a primary gas flow in a turbojet engine, and also at least one intermediate space, the internal ferrule being provided with at least one primary orifice and at least one moveable door forming a primary conduit for passage of air, said door being capable of sampling, from the primary orifice, air circulating in the primary gas space and sending back to the intermediate space the sampled air in the direction of a secondary conduit for passage of air, said hub being characterized in that the primary conduit has an internal surface comprising from upstream to downstream a convergent upstream part, then a non-convergent downstream part, in which the downstream part comprises two portions of downstream lateral surfaces, and in which the upstream part further comprises two portions of upstream lateral surfaces, each portion of upstream lateral surface defining with a respective downstream lateral surface a lateral part of the internal surface, each portion of downstream lateral surface having a length according to an upstream-downstream direction representing between 30% and 50% of the curvilinear length from upstream to downstream of the corresponding lateral part.

It is clear that the upstream and downstream directions are defined in relation to the flow of the primary gas flow when the hub of the intermediate casing according to the invention is used in a turbojet engine.

Such a primary conduit having a non-convergent downstream part counteracts the effect of convergence naturally caused by the upstream part, and ensures that an airflow terminating in the intermediate space via the outlet orifice reaches a majority of the inlet orifice of the opposite secondary conduit.

Given that a greater portion of the internal volume of the secondary conduit is occupied by the airflow, such a primary conduit improves the flow rate sampling in the secondary conduit, and consequently the overall airflow rate sampled from the primary flow space.

Also, the fact that the portions of downstream lateral surfaces cover more than 30% of the portions of lateral surfaces ensures that the airflow will have time, between the instant when this flow passes from the upstream part to the downstream part, and the instant when the flow reaches the outlet orifice, to be recovered so as to no longer converge.

The fact that the portions of downstream lateral surfaces cover less than 50% of the portions of lateral surfaces also avoids imposing an excessive angle for transition between upstream lateral part and downstream lateral part, the width of the inlet orifice in effect being restricted by adjacent equipment. Such an excessive angle in effect would cause unwanted flow detachment.

The range of 30% to 50% therefore offers a good compromise between limitation of detachment phenomena and convergence attenuation of the flow in the downstream part.

The invention can be completed by the following characteristics, taken singly or in any of their technically possible combinations.

Since the door is movably mounted on the internal ferrule between a closing position and a maximum opening position of the primary orifice, the downstream part can be contoured to direct airflow towards the entirety of the inlet orifice of the opposite secondary conduit when the door is in its maximum opening position. Therefore, the flow rate sampling in the secondary conduit is maximized during critical phases in which the door is wide open and in which the risks of deterioration of the compressor caused by pumping are the highest.

The non-convergent downstream part can tangentially prolong the corresponding upstream part to minimize perturbations undergone by airflow at the junction between the upstream and downstream parts of the primary conduit.

The downstream part can be defined by two portions of downstream lateral surfaces and two radially internal and external surface portions relative to the axis M of the hub, said radially internal and external portions being mutually non-convergent.

Each portion of downstream lateral surface can be planar and form a flaring angle from upstream to downstream of less than 5° with an average flow axis of the corresponding door. This limits the divergence of an airflow terminating in the intermediate space by the outlet orifice in an azimuthal plane of the primary conduit.

The upstream part can comprise two portions of upstream lateral surfaces each defining with a respective downstream lateral surface a lateral part of the internal surface, and each portion of downstream lateral surface can have a length according to an upstream-downstream direction representing 40% of the curvilinear length from upstream to downstream of the corresponding lateral part.

This minimum length effectively corrects the convergent character of an airflow having passed through the upstream part, before this flow terminates in the intermediate space via the outlet orifice of the primary conduit of the door.

Each side wall can also have an S-shaped profile. This arrangement minimizes or even prevents bursting of the jet in the intermediate space on exiting the door and favours its capture by the secondary conduit, and limits circulation in the intermediate space.

The downstream part can be cylindrical. This alignment ensures that an airflow terminating in the intermediate space has divergence close to zero.

The secondary conduit can be extended from its inlet orifice by a deflector extending upstream in the corresponding intermediate space, each deflector forming an air guide conduit having an internal surface extending from said inlet orifice as far as a guide orifice arranged downstream of the outlet orifice of the corresponding door, and in which the downstream part is contoured to confine an airflow towards the inside of the circumference of the guide orifice when the door is in its maximum opening position. Such a deflector prevents recirculation phenomena in the intermediate space.

An intermediate casing for an aircraft turbojet engine is also proposed, characterized in that it comprises a hub such as described previously.

An aircraft turbojet engine is also proposed, characterized in that it comprises the preceding intermediate casing.

DESCRIPTION OF FIGURES

Other characteristics, aims and advantages of the invention will emerge from the following description which is purely illustrative and non-limiting and which must be considered with respect to the appended drawings, in which:

FIG. 9 is a side view of the deflector illustrated in FIG. 8a.

FIG. 10, is a plan view parallel to an azimuthal plane of the deflector illustrated in FIG. 8a.

In all figures similar elements have identical reference numerals.

DETAILED DESCRIPTION OF THE INVENTION

The hub parts for intermediate casing of the prior art already described are also present in the following embodiments, with the exception of deflectors forming tabs.

First Aspect: Geometry of Scooping Doors

The structure of the doors 100 will be described with respect to FIGS. 4 to 7.

Figure 4:
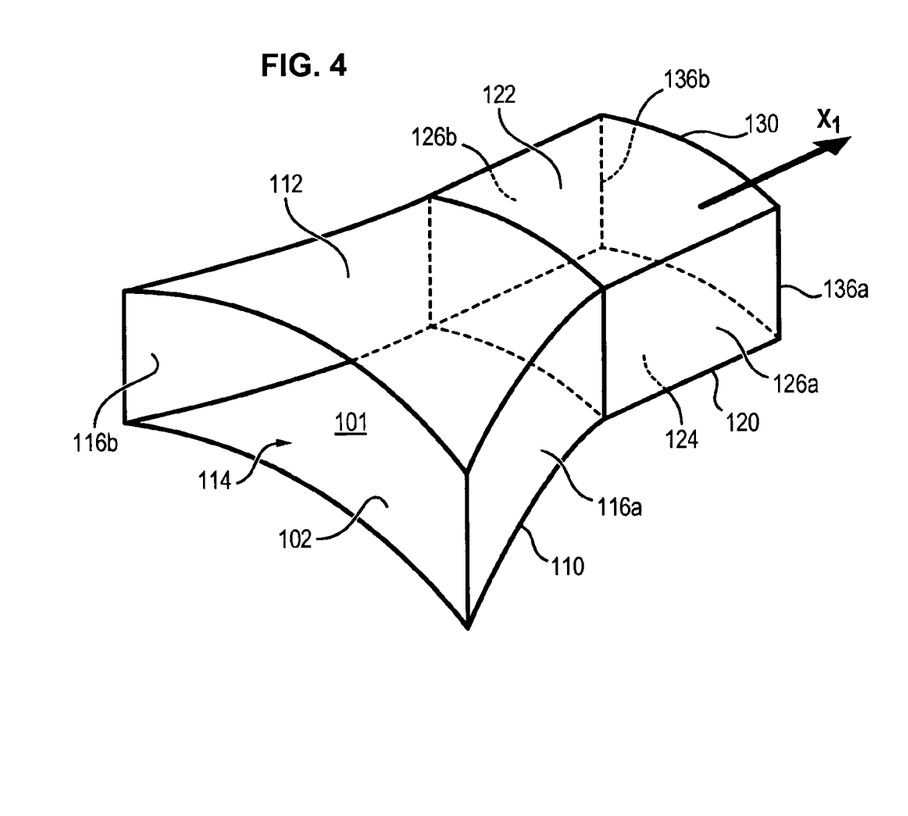
FIG. 4, is a schematic view in perspective of the internal surface of a door 100 according to an embodiment.

In reference to FIG. 4, each door 100 has a closed internal surface 102. Each internal surface 102 includes from the upstream to downstream, an upstream part 110 then a downstream part 120 terminating on the corresponding outlet orifice 130.

Each door 100 has an average gas flow axis X1 at its outlet orifice 130.

The upstream part 110 is convergent from upstream to downstream, from the inlet orifice of the door 100 to an intermediate section of the conduit. The term "convergent" here means that the field of vectors associated with a gas flow flowing from upstream to downstream in the upstream part 110 of the primary conduit 101 has negative divergence.

The downstream part 120 is non-convergent from upstream to downstream. In other words, the field of vectors associated with a gas flow flowing from upstream to downstream in the downstream part 120 has zero or positive divergence.

The upstream part 110 comprises a portion of radially external surface 112 relative to the axis M of the hub, a portion of radially internal surface 114 relative to the axis M of the hub, and two portions of lateral surfaces 116a and 116b.

The downstream part 120 similarly comprises a portion of radially external surface 122 relative to the axis M of the hub, a portion of radially internal surface 124 relative to the axis M of the hub, and two portions of lateral surfaces 126a and 126b.

The outlet orifice 130 of the door conduit 100 also has a circumference comprising a radially external edge 132, a radially internal edge 134 and two lateral edges 136a and 136b, in which respectively terminate the portion of radially external surface 122, the portion of radially internal surface 124 and the portions of downstream lateral surfaces 126a, 126b.

Also, the radially external 122 and internal 14 surface portions tangentially extend the external 112 and internal 114 surface portions respectively.

The portions of downstream surface 122, 124 can be portions of cylinder of generatrices parallel to the average gas flow axis X1 in the downstream part 120 of the door 100. This parallelism limits the burst phenomena of flow in the intermediate space in a meridian plane, and improves the guiding of air towards the opposite secondary orifice in the intermediate space 5.

The portions of downstream external surfaces 124, 122 can have concavity turned radially towards the external relative to the axis M of the hub so as to embrace the contour of the internal annular ferrule 4. For example, the portions 122, 124 can be portions of a cylinder whereof the generatrices are parallel to the flow axis X1.

As a variant not illustrated, the downstream portions 122, 124 of the door 100 can be planar, and the edges 132 and 134 be rectilinear.

Figure 5:
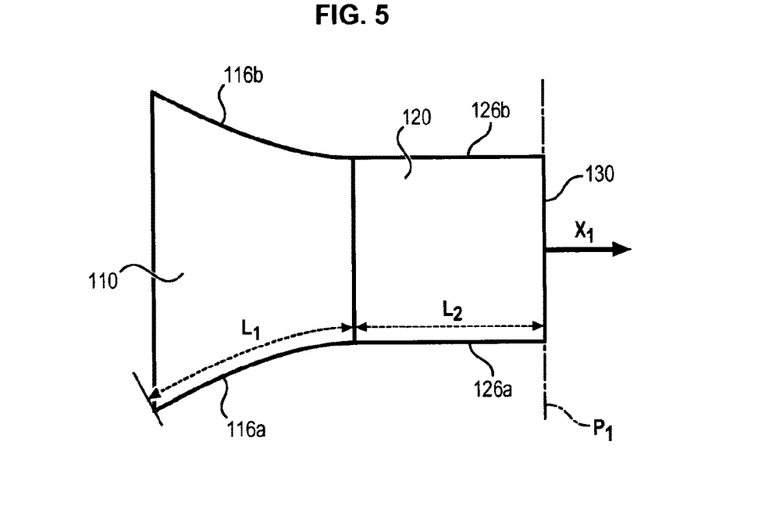
FIG. 5 is a schematic side view of the door 100 already illustrated in FIG. 4.

In an azimuthal plane parallel to the plane of FIG. 5, the width of the outlet orifice 130 is less than the width of the primary orifice 44; the conduit has a convergent azimuthal profile from upstream to downstream.

Each upstream lateral part 116a, 116b is connected to a respective downstream lateral part 126a, 126b. The two upstream lateral parts 116a, 116b are mutually convergent, that is, they approach each other progressively when the conduit is traveled from upstream to downstream. Each upstream lateral part 116a, 116b can be planar, curved, or a combination of both. The upstream lateral parts 116a, 116b converge a primary gas flow from upstream to downstream in the azimuthal plane.

Each downstream lateral part 126a, 126b tangentially extends a corresponding upstream lateral part 116a, 116b and terminates in a lateral edge of the orifice 136a, 136b. For example, each lateral part in its entirety is a portion of cylinder of generatrices perpendicular to the average flow axis X1 in the conduit of the door 100. In this portion of cylinder, the lateral part downstream is planar.

The two downstream lateral parts are substantially parallel, that is, an angle of less than 5° is formed between each plane of a downstream lateral part and the average flow axis X1.

The downstream lateral parts correct the convergence effect in the azimuthal plane previously caused by the upstream lateral parts, and limit the divergence of the flow sent to the intermediate space 5. In other words, the field of vectors represented by airflow at the outlet orifice 130 will have limited divergence between a negative value dependent on the upstream lateral parts, and zero.

Figure 6:
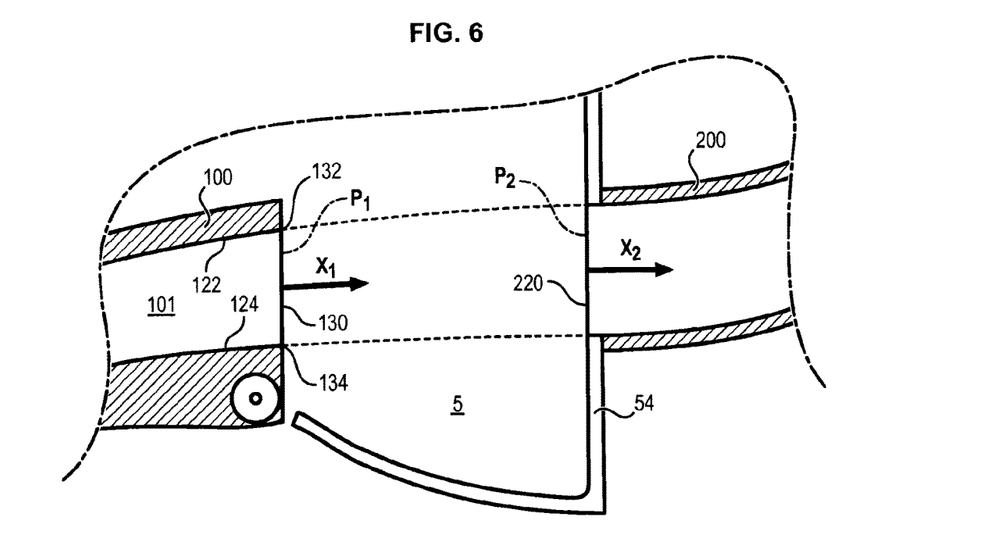
FIG. 6 is a partial schematic view in axial section of an evacuation system comprising the door 100 illustrated in FIGS. 4 and 5.

An average flow axis X2 is defined in a plane P2 defined by the inlet orifice 220 of the secondary conduit 200 (illustrated especially in FIG. 6).

All the tangents of the downstream part 120 at the circumference of the outlet orifice 130 delimit a closed surface. This closed surface intersects the plane P2 of the inlet orifice 220 of the opposite secondary conduit 200 in a closed line which encompasses or coincides with the circumference of said inlet orifice 220.

This particular alignment of the tangents of the downstream part 120 enables spreading of the gas flow over the entire extent of the inlet orifice of the secondary conduit, and improves the feed of the secondary conduit in the meridian and azimuthal plane.

In the embodiment illustrated in FIG. 6, the door 100 is illustrated in its maximum open position. The closed surface formed by all the tangents at the outlet orifice 130 intersects the plane of the orifice in the circumference of the secondary orifice 220. So the recirculation phenomena in the intermediate space 5 are avoided when the door is in the full open position.

Each portion of downstream lateral surface 126a, 126b has a length referenced L2, according to the upstream-downstream direction defined by the axis X1. Each upstream lateral portion 116a, 116b has a curvilinear length from upstream to downstream referenced L1. Each lateral part of the conduit defined by a portion of upstream lateral surface and a portion of downstream lateral surface therefore has a total curvilinear length from upstream to downstream equal to the sum of the lengths L1 and L2. Each portion of downstream lateral surface 126a, 126b preferably has a length L1 of between 30% and 50%, preferably 40% of the total curvilinear length L1+L2 of a corresponding lateral part. This minimum length of 30% corrects the convergence of a flow imposed by the upstream part 110, and has it tend towards zero the divergence of the gas flow at the outlet orifice 130.

Figure 7:
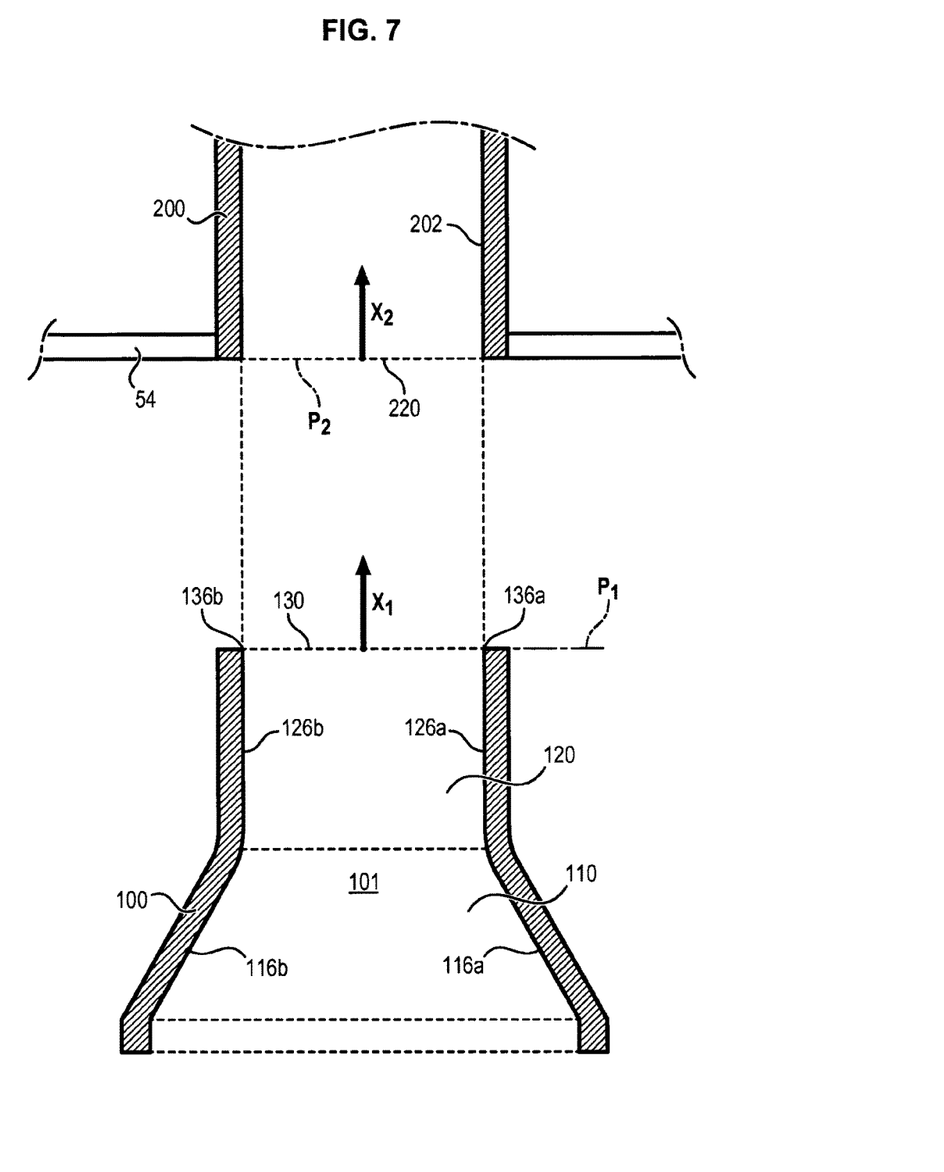
FIG. 7 is a schematic partial plan view in an azimuthal plane of the system illustrated in FIG. 6.

In reference to FIG. 7, each portion of lateral surface can present an S-shaped profile from the inlet orifice to the outlet orifice. In other words, the profile of each portion of lateral surface has a single point of inflection.

This arrangement does not perturb the flow of the flow in the space 40 and minimize or even prevent bursting of this flow in the intermediate space 5 at output of the door, and favours its capture by the secondary conduit 20 and limits recirculation in the intermediate space 5.

Second Aspect: Deflectors of Secondary Conduit

Deflectors according to a second aspect will now be described, with respect to FIGS. 8a to 12.

Each secondary conduit 200 has a closed internal surface 202.

Figure 8A:
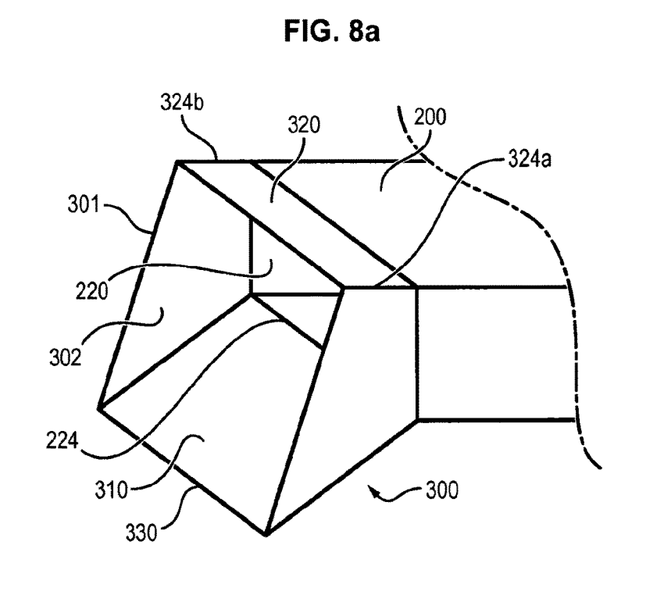
FIGS. 8a and 8b are schematic views in side perspective of a deflector according to a first embodiment.
Figure 8B:
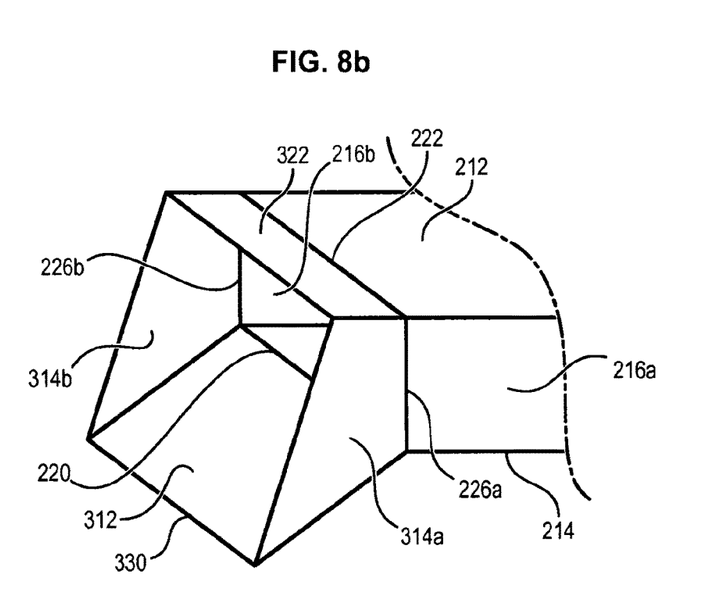

A deflector 300 forming an air guide conduit 310 extends from the inlet orifice 220 of the secondary conduit 200 to upstream of the downstream transversal endshield 54, in the intermediate space 5. The air guide conduit 301 is also a closed surface extending from downstream to upstream from the circumference of the inlet orifice 220 as far as a guide orifice 330.

The air guide conduit 301 forms an upstream extension of the secondary conduit 200, which can for example be fixed by fastening means (not illustrated) against the surface of the downstream transversal endshield opening into the intermediate space 5. In this way, the deflector can be mounted or dismounted in the intermediate space during upkeep to the turbojet engine without the downstream transversal endshield 54 or the secondary conduit 200 having to be dismounted.

The guide conduit 301 has an internal surface called guide surface 302 constituted by at least two parts of surfaces each extending between the inlet orifice 220 and the guide orifice 330: at least one part known as flared 310 and at least one part known as tangent 320.

The tangent part 320 extends a first part of the internal surface 202 of the secondary conduit 200 tangentially over its whole length between the inlet orifice 220 of the conduit and the guide orifice 330. The tangent portion 320 is for example a portion of cylinder of generatrices parallel to the average flow axis X2.

The tangent portion 320 is joined to the flared part 310 by two end generatrices 324a and 324b, these end generatrices being parallel to the axis X2 and extending between the inlet orifice 220 and the guide orifice 330.

Also, any plane tangent at any point of the flared part 310 forms with the average flow axis X2 an angle less than 90°.

Figure 9:
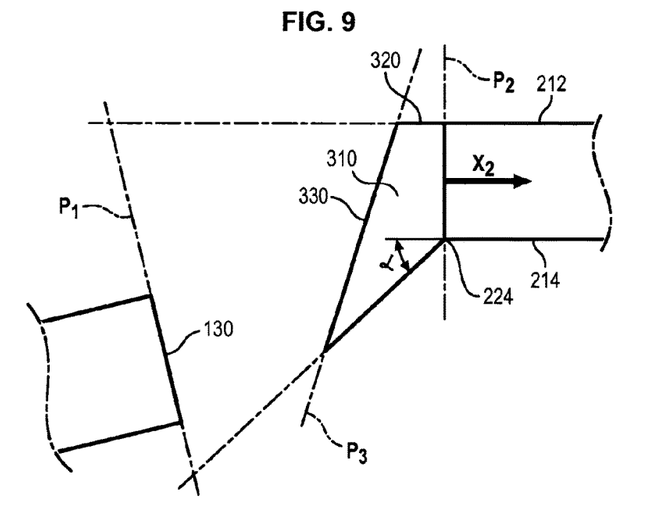
Figure 10:
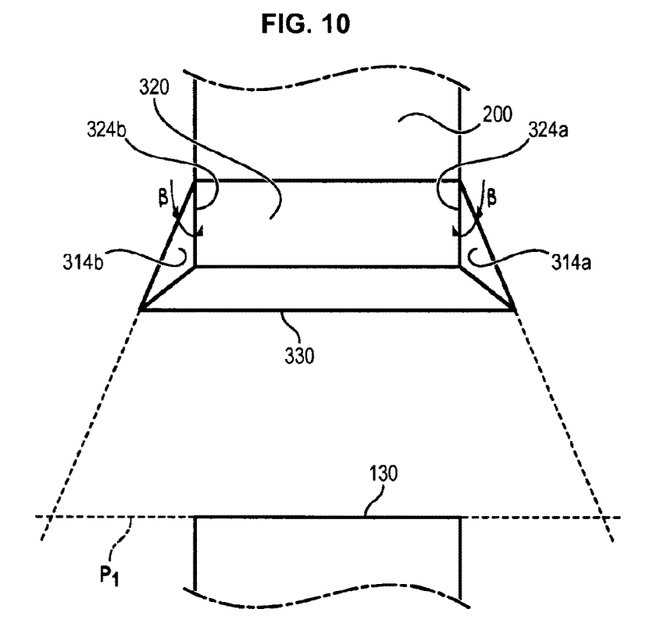

In reference to FIG. 9, all the tangents of the internal guide surface 302 in the circumference of the guide orifice 330 of the deflector 300 delimit a closed surface. This closed surface intersects the plane P1 of the outlet orifice of the opposite door 100 in a closed line which encompasses or coincides with the circumference of the outlet orifice 130 of the door 100.

This particular alignment of tangents of the downstream part improves the collecting function of the deflector 300. In effect, a gas flow entering the intermediate space 5 via the outlet orifice 130 of the door 100 undergoes natural three-dimensional bursting likely to create the refluxes described in the preamble, which this alignment confines.

In the embodiments illustrated in FIGS. 8a to 12, the secondary conduit 200 has a secondary internal surface comprising a portion of radially internal surface 214 relative to the axis M of the hub, a portion of radially external surface relative to the axis M of the hub 212, and two portions of lateral surfaces 216a, 216b.

The inlet orifice 220 further has a circumference comprising a radially internal edge 224, a radially external edge 222 and two lateral edges 226a and 226b respectively connected to the radially internal portion 214, the radially external portion 212 and the lateral portions 216a, 216b of the internal surface 202.

Also, the internal guide surface comprises a radially internal portion 312, a radially external portion 322, and two lateral portions 314a, 314b respectively connected to the radially internal edge 224, the radially external edge 222 and the two lateral edges 226a and 226b of the inlet orifice 220.

Similarly, the guide orifice 330 has a circumference comprising a radially internal edge, a radially external edge and two lateral edges, in which terminate respectively the radially internal, external and lateral portions of the internal guide surface.

The flared part 310 comprises the radially internal portion 312 and the lateral portions 314a, 314b of the guide surface, whereas the tangent portion 320 is the radially external portion 320.

The radially internal portion is planar and forms a meridian flaring angle $\alpha$ constant relative to the radially internal portion 224 of the secondary conduit 200 which it prolongs. This meridian flaring angle $\alpha$ is strictly greater than 0° and preferably less than 90°, for example 45°.

Each lateral portion 314a, 314b of the guide conduit 301, extending from a respective lateral edge of the orifice, has an azimuthal flaring angle $\beta$ at most equal to 45°, preferably between 20 and 35°, relative to the lateral portion 216a, 216b of the respective secondary conduit 200 which it prolongs.

Each lateral portion 314a, 314b is a regulated surface delimited at least by an end generatrix of the tangent part 320, and a respective lateral edge 226a, 226b of the inlet orifice 220.

The internal surface 302 is a regulated surface of generatrices extending between the inlet orifice 220 of the secondary conduit 200 and the guide orifice 330.

The lateral portion of the guide conduit 301, extending from a respective lateral edge of the orifice, presents an azimuthal flaring angle at most equal to 45° relative to the lateral portion of the secondary conduit 200 which it prolongs.

The average length of the radially internal portion 312 between the orifices 220 and 330 can be identical or different to the average length of the radially external portion 322.

For example, the average length of the radially internal portion 312 between the orifices 220 and 330 can be greater than the average length of the radially external portion 222. This improves the collecting function of the deflector in the radially internal part of the intermediate space, and limits its bulk in an upstream part of the intermediate space, which is generally intended to be occupied by other equipment of the turbojet engine.

In the embodiment of a deflector illustrated in FIGS. 8a and 8b, the inlet orifice 200 has a rectangular circumference. The guide orifice 330 has a trapezoid form.

The radially external portion 322 is planar, coplanar with the portion of the secondary conduit 200 which it prolongs.

The tangent and flared parts are joined by end generatrices 324a, 324b forming ridges in the internal guide surface.

Figure 11:
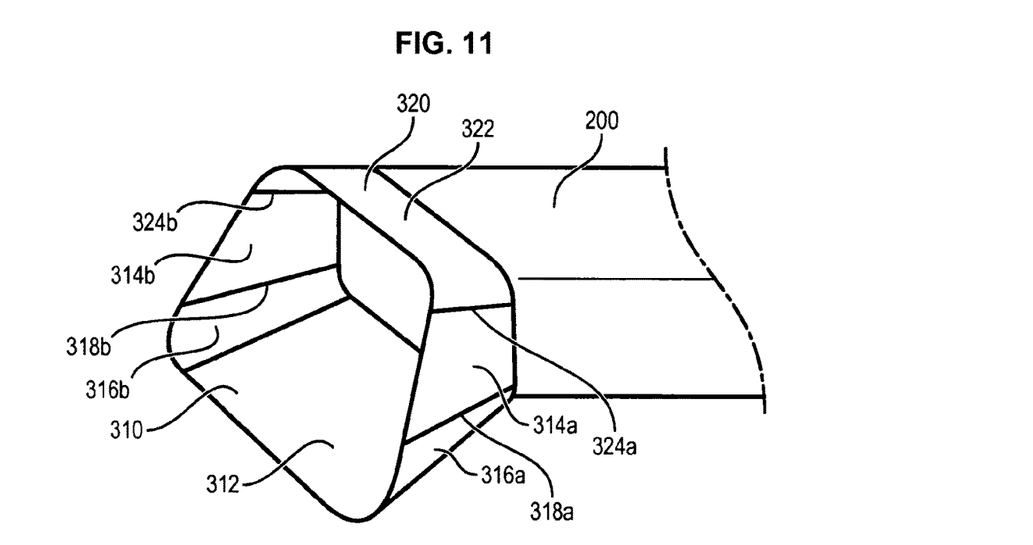
FIG. 11 is a schematic view in side perspective of a deflector according to a second embodiment.
Figure 12:
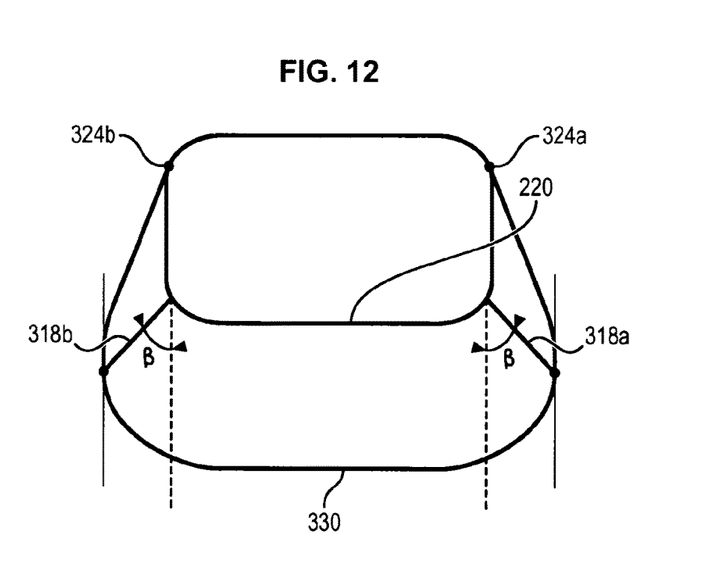
FIG. 12 is a schematic frontal view of the deflector illustrated in FIG. 11.

In the deflector embodiment illustrated in FIGS. 11 and 12, the inlet orifice 220 of the conduit has a rectangular circumference with rounded corners. The guide orifice 330 is trapezoid in form.

The tangent portion 320 is a portion of cylinder comprising a planar central sub-portion and two curved sub-portions connected on either side of the central sub-portion and terminating by the end generatrices 324a, 324b.

The flared part 310 comprises the radially internal portion 312, the two lateral portions 314a, 314b, and two intermediate portions 316a, 316b. Each intermediate portion 316a, 316b forms a junction between the radially internal portion 312 and a respective lateral portion 314a, 314b.

Each intermediate sub-portion 316a, 316b is connected to a respective lateral portion in an intermediate generatrix 318a, 318b. In this embodiment the flaring azimuthal angle is maximum in each intermediate generatrix.

Of course, the deflector is not limited to the embodiments illustrated in FIGS. 8a to 12.

Each deflector can be generalized to a conduit comprising an internal guide surface creating transition between the respective circumferences of the orifices 220 and 330, these two circumferences being any closed lines, for example ovoid or polygonal.

The portions of the internal guide surface can have concavity turned towards the inside or towards the outside of the guide conduit 301. The radially internal 312 and external 322 portions can present concavity turned towards the axis M of the hub, or moving away from this axis.

The internal guide surface 302 of the deflector 300 can have more than one flared part. As a variant, the flared part can be extended to the whole internal guide surface.

Combination of First and Second Aspects

The door 100 according to the first aspect and the deflector 300 according to the second aspect can be combined in a same hub for intermediate casing.

In reference to FIG. 9, all the tangents of the downstream part 120 of each door 100 in the circumference of the outlet orifice 130 can delimit a closed surface which intersects both the plane P2 of the inlet orifice 220 of the opposite secondary conduit 200 in a closed line which encompasses or coincides with the circumference of said the inlet orifice 330, as described previously, and also intersects a plane P3 defined by the guide orifice 330 in a closed line which is included in the circumference of said guide orifice 330.

Such alignment lets the deflector collect the entirety of a gas flow emanating from the door 100 and having passed through the intermediate space 5, and this flow passes through the inlet orifice 220 according to its whole area. Such alignment therefore prevents recirculation of flow in the intermediate space at the same time, and ensures a maximum sampling flow rate in the secondary conduit.

The invention claimed is:

1. A hub of an intermediate casing for an aircraft turbojet engine, comprising an internal ferrule configured to delimit both a primary flow space of a primary gas flow in a turbojet engine, and also at least one intermediate space, the internal ferrule being provided with at least one primary orifice as well as at least one moveable door forming a primary conduit for passage of air, said door being capable of sampling, from the primary orifice, air circulating in the primary gas space and sending back into the intermediate space sampled air in the direction of a secondary conduit for passage of air, wherein the primary conduit has an internal surface comprising from upstream to downstream a convergent upstream part, then a non-convergent downstream part in which the downstream part comprises two portions of downstream lateral surfaces, and in which the upstream part further comprises two portions of upstream lateral surfaces, each portion of upstream lateral surface defining with a respective downstream lateral surface a lateral part of the internal surface, each portion of downstream lateral surface having a length according to an upstream-downstream direction representing between 30% and 50% of the curvilinear length from upstream to downstream of the corresponding lateral part.

2. The hub of an intermediate casing according to claim 1, wherein each portion of downstream lateral surface is planar and forms an flaring angle from upstream to downstream of less than 5° with an average flow axis of the corresponding door.

3. The hub of an intermediate casing according to claim 1, wherein each portion of lateral surface presents an S-shaped profile.

4. The hub of an intermediate casing according to claim 1, wherein each door is movably mounted on the internal ferrule between a closing position and a maximum opening position of the primary orifice, and wherein the downstream part is contoured to direct airflow towards the entirety of the inlet orifice of the opposite secondary conduit when the door is in its maximum opening position.

5. The hub of an intermediate casing according to claim 1, wherein the non-convergent downstream part tangentially extends the corresponding upstream part.

6. The hub of an intermediate casing according to claim 1, wherein the downstream part is defined by two portions of downstream lateral surface and two radially internal and external surface portions relative to the axis of the hub, said radially internal and external portions being mutually non-convergent.

7. The hub of an intermediate casing according to claim 1, wherein the downstream part is cylindrical.

8. The hub of an intermediate casing according to claim 1, wherein each secondary conduit is extended from its inlet orifice by a deflector extending upstream into the corresponding intermediate space, each deflector forming an air guide conduit having an internal surface extending from said inlet orifice as far as a guide orifice arranged downstream of the outlet orifice of the corresponding door, and wherein the downstream part is contoured to confine an airflow towards the inside of the circumference of the guide orifice when the door is in a maximum opening position.

9. An intermediate casing for an aircraft turbojet engine, comprising the hub according to claim 1.

10. An aircraft turbojet engine, comprising the intermediate casing according to claim 1.

* * * * *